Patented Nov. 28, 1944

2,364,028

UNITED STATES PATENT OFFICE 2,364,028

CONVERTING WATER SOLUBLE CELLULOSE ETHERS TO SHEET FORM

Floyd C. Peterson, Midland, Mich., assignor to The Dow Chemical Company, Midland, Mich., a corporation of Michigan No Drawing. Application July 24, 1940,
Serial No. 347,246

2 Claims. (Cl. 92—39)

This invention relates to a method of altering the physical form of those fibrous cellulose ethers which are soluble in cold water and insoluble in hot water, so as to facilitate the handling and storage thereof and to improve the solubility thereof in cold water.

Cellulose ethers are usually prepared by reaction at suitably elevated temperatures between an alkyl halide or alkyl sulfate and alkali cellulose, the latter being a complex formed from cellulose, caustic alkali and water. The reaction mixture, after the ether has been formed, contains, besides the cellulose ether, some salt, alkyl alcohol, dialkyl ether, and water. Certain cellulose ethers, notably methyl cellulose, are insoluble in hot water, but are soluble in cold water. As ordinarily obtained by precipitation from the reaction mass wherein they are made, such ethers have the form of fine fluffy particles which have a very low apparent density, and consequently a large exposed surface area relative to their actual weight. The storage of such cellulose ethers presents a problem, inasmuch as they must be kept in tightly sealed containers to prevent or to minimize absorption of air-borne moisture by the ether particles. The customary product suffers from another disadvantage in that it must first be heated to above about 70° C. in water, and the hot suspension allowed to cool before the product actually dissolves readily to form a clear solution in cold water. When such cellulose ethers have been formed into compressed cakes, to reduce the exposed area and thus to minimize moisture absorption, it has been found that the product needs be pulverized before any practical solution rate in water can be obtained. When the herein concerned cellulose ethers are taken from the crude reaction mixture in which they are prepared, mixed with cold water to form an imperfect solution, and heated to above 70° C. with the intent to precipitate and purify the ether, there is obtained a gel which absorbs salts and other impurities rather than a solid, fibrous product. The so formed product is hard to handle, and difficulty is encountered in dissolving the product and in filtering its solutions.

It is, therefore, an object of the invention to provide a method for obtaining cold water soluble, hot water insoluble cellulose ethers, such as methyl cellulose, in compact, fibrous form to insure convenience in packing, storing and handling. Another object of the invention is to provide a method for obtaining the said cellulose ethers in a form of higher apparent density than that of the prior art while, simultaneously, improving the ability of the product to dissolve in cold water. It is a further object of the invention to provide a continuous process whereby the foregoing objects may be attained.

Other objects and advantages of the invention will become apparent as the description proceeds.

According to one embodiment of the invention, the reaction mass resulting from the preparation of a water soluble cellulose ether, containing said ether, salt, and possibly some alkali, is intimately mixed with water at a temperature above about 70° C. and preferably near 90°–95° C., and the so-formed slurry is filtered to extract substantially all of the salt and hot water soluble impurities. The cellulose ether, now in the form of fibers, is again admixed with sufficient hot water to form a slurry of 0.5 to 5 per cent concentration, which is, in turn, passed through a Jordan engine or similar beater or pulp refiner to break up any lumps which might be present and to separate the mass into the individual fiber constituents. The so-formed cellulose ether particles are thereafter formed into a sheet by pouring the slurry of fibers over a foraminous support, such as a cylinder vat machine, vacuum filter type machine, Fourdrinier machine, etc., where it is deposited in fibrous, compact form in a manner well known in the paper-making art. The so-formed sheet is removed from the support and dried by passing over a conventional drying cylinder or similar apparatus and formed into rolls or cut into smaller sheets, and wrapped. The temperature of the cellulose ether must be maintained above about 70° C. throughout the process, from the time at which the crude ether is first mixed with hot water, at least until the residual moisture in the product being dried is below 50 per cent, to avoid gelation and the formation of a material which is difficult to redissolve.

The product obtained by the improved process is a fibrous material readily adapted to a continuous, entirely mechanical drying and packaging process and may be stored in the form of compact rolls or sheets which are easily covered and protected from contamination by dust or from undesirable absorption of moisture. Moreover, the rolls, if desired, may be stored without an additional covering, utilizing the outside layer as the protective medium. The product is a uniform, fibrous solid of extremely high apparent density as compared with the powdery or fluffy product commercially available in the past, and possesses excellent solubility in water when added directly thereto at temperatures suitably near 30°–35° C. In addition, the product does not require mechanical pulverization to prepare it for further use.

Other modes of applying the principle of my invention may be employed instead of the one explained, change being made as regards the process herein disclosed, provided the step or steps stated by any of the following claims or the equivalent of such stated step or steps be employed.

I, therefore, particularly point out and distinctly claim as my invention:

1. In a process for preparing methyl cellulose in a compact form directly and readily soluble in sheet form in cold water, the steps including suspending methyl cellulose in water to form a slurry of concentration between 0.5 and 5 per cent at a temperature above about 70° C., beating the slurry to form methyl cellulose fibers, spreading the slurry over a foraminous support to form a continuous fibrous sheet, drying the sheet, and maintaining throughout the recited steps a temperature above about 70° C. at least until the residual moisture content of the fibrous sheet is below 50 per cent.

2. In a process for preparing methyl cellulose in a compact form directly and readily soluble in sheet form in cold water, the steps including suspending methyl cellulose in water to form a slurry of concentration between 0.5 and 5 per cent, at a temperature between about 90° and about 95° C., beating the slurry to form methyl cellulose fibers, spreading the slurry over a foraminous support to form a continuous fibrous sheet, drying the sheet, and maintaining throughout the recited steps a temperature above about 70° C. at least until the residual moisture content of the fibrous sheet is below 50 per cent.

FLOYD C. PETERSON.